United States Patent [19]

Dahn et al.

[11] Patent Number: 5,961,950
[45] Date of Patent: Oct. 5, 1999

[54] METHOD FOR PREPARING SOLID SOLUTION MATERIALS SUCH AS LITHIUM MANGANESE OXIDE

[75] Inventors: Jeffery Raymond Dahn, Surrey; Erik Rossen, North Vancouver; Jan N. Reimers; Eric Wayne Fuller, both of Maple Ridge, all of Canada

[73] Assignee: NEC Moli Energy (Canada) Limited, Maple Ridge, Canada

[21] Appl. No.: 08/999,732

[22] Filed: Dec. 29, 1997

Related U.S. Application Data

[63] Continuation-in-part of application No. 08/581,303, Dec. 28, 1995, abandoned, which is a continuation of application No. 08/201,462, Feb. 24, 1994, abandoned.

[30] Foreign Application Priority Data

May 14, 1993 [CA] Canada ................................. 2096264

[51] Int. Cl.⁶ ............................. C01G 45/00; C01D 15/00
[52] U.S. Cl. ........................ 423/599; 423/179.5; 423/49
[58] Field of Search ................................ 423/599, 179.5, 423/49; 429/224

[56] References Cited

U.S. PATENT DOCUMENTS 5,166,012  11/1992  Rossouw et al. ....................... 423/599

*Primary Examiner*—Steven Bos
*Attorney, Agent, or Firm*—Synnestvedt & Lechner LLP

[57] ABSTRACT

Lithiated manganese oxides are synthesized using a novel two stage process. Using appropriate starting materials, lithiation is accomplished via low temperature ion exchange in aqueous warm salt solution. A drying stage follows which completes the synthesis. Materials suitable for use as cathodes in lithium ion rechargeable batteries have been prepared in this way. Other solid solution transition metal materials might also be prepared using a similar low temperature ion exchange process.

12 Claims, 11 Drawing Sheets

(−) STAINLESS STEEL CELL CAP

POLYPROPYLENE GASKET

MILD STEEL DISC SPRING

STAINLESS STEEL DISC

LITHIUM METAL

SEPARATOR

CATHODE (+) CORROSION RESISTANT STAINLESS STEEL CELL CAN

HEATED LiOH TREATED EMD

METHOD FOR PREPARING SOLID SOLUTION MATERIALS SUCH AS LITHIUM MANGANESE OXIDE

This application is a Continuation-In-Part of application Ser. No. 08/581,303, filed Dec. 28, 1995, which in turn is a Continuation of application Ser. No. 08/201,462, filed Feb. 24, 1994, both now abandoned. Both earlier-filed applications are incorporated herein by reference.

FIELD OF THE INVENTION

This invention relates to solid solution transition metal oxides, especially lithiated manganese oxides, processes for synthesizing these materials, and their use as active electrode materials in electrochemical cells. In particular, the invention relates to the synthesis of such materials for use as cathodes in lithium ion rechargeable batteries.

BACKGROUND OF THE INVENTION

Lithium batteries are becoming increasingly popular in the market place as they offer advantages of high voltage and energy density over conventional aqueous technologies. Recent developments in the field are allowing lithium battery technologies to meet the demands of ever greater energy density requirements for electronics applications.

Primary lithium batteries and historically secondary lithium batteries have used metallic lithium or a lithium alloy for the anode and often a transition metal chalcogenide for the corresponding cathode. The discharge process of batteries constructed in this way involves the transfer of lithium atoms from the anode into the host cathode. Thus, primary cells preferably have minimal lithium in the cathode as fabricated in order to obtain maximum capacity on discharge. Certain advantages however can be obtained by partially lithiating the cathode prior to battery fabrication. Common commercial cathode materials include manganese oxide compounds. As taught in the Hitachi Maxell KK, Japanese patent publication 59-31182 (1984), discharge performance and shelf stability of a non-aqueous Li|$MnO_2$ primary cell can be improved by partial lithiation of the $MnO_2$ cathode followed by appropriate heat treatment. This was accomplished by soaking the $MnO_2$ in LiOH solution and then heat treating preferably around 300° C. The $MnO_2$ contains significant amounts of bound water which is driven off by heating. In this publication, it is stated that the presence of lithium in the host $MnO_2$ prevents undesirable changes on heating.

The prior art contains other references teaching similar ways of lithiating manganese oxides for use in batteries. Sanyo, Japanese Kokai 62-108455 (1987) disclose a secondary battery employing cathode of lithium doped gamma phase electrolytic manganese dioxide made in the same general way described in the Hitachi '182 publication. Toshiba, Japanese Kokai 62-126556 (1987) describe batteries made with cathode material prepared from LiOH treated $MnO_2$. Moli, U.S. Pat. No. 4,959,282, describe the preparation of what was called "X-phase" cathode material for batteries where the lithiated manganese oxide is first coated with LiOH solid via evaporation from solution followed by a heat treatment step. In all the preceding examples, only partial lithiation of the manganese compound is performed. Further, in the latter example, the lithiation is predominantly achieved via a solid state reaction.

In U.S. Pat. No. 5,166,012, Roussouw et al. disclose preparation methods for certain lithiated manganese oxide compounds wherein more substantial lithiation is achieved. In particular, a compound having a hollandite structure with stoichiometry $H_{2x-z}Li_zMnO_{2+x}$ wherein z might be as great as 0.6 is disclosed. As is commonly known in the art, Roussouw confirms that some amount (undefined) of lithiation can be expected to occur via the partial ion exchange reaction of lithium for hydrogen in the starting hydrogen manganese oxide reactant. However, those of ordinary skill in the art will realize that the lithiation is predominantly accomplished via a conventional solid state reaction. The presence of water during the synthesis and hence even the conditions necessary for ion exchange are not essential to the disclosed methods. Thus, while ion exchange certainly can take place in the preparation of $H_{2x-z}Li_zMnO_{2+x}$, lithiation occurs predominantly via a solid state reaction. Accordingly, the amount of lithium which is ion exchanged must be, at most, a small fraction of the total lithium content, z.

Recent developments in the field have led to the commercialization of rechargeable lithium batteries where a host compound, usually a form of carbon, has been used in place of lithium metal and/or alloy as the anode. During use of the battery, lithium ions are shuttled or rocked from the cathode to the anode on charge and from the anode to the cathode on discharge. Such batteries are called Lithium ion cells (T. Nagaura and K. Tozawa, Progress in Batteries and Solar Cells, 9, 209, (1990)) or Rocking Chair cells (J. R. Dahn, et al., J. Electrochem. Soc. 138, 2207 (1991)) Such batteries provide increased safety and cycle life over historical rechargeable lithium technologies.

It is desirable for practical reasons that the battery components be relatively stable in dry air for manufacturing purposes. It is also desirable that substantial amounts of lithium be incorporated in the electrode materials such that use of the inherent capacity of the materials can be maximized without having to add lithium in some other form. Lithium atoms therefore usually reside in the transition metal chalcogenide cathode when fabricated as the preferred compounds for use can incorporate large amounts of lithium yet still remain stable in dry air.

Sony Energy Tec Inc. was the first company to commercialize lithium ion batteries where $LiCoO_2$ was used as a cathode material. Many other such materials have been proposed such as $LiNiO_2$ (Goodenough et al., U.S. Pat. No. 4,302,518 and/or Dahn et al., J. Electrochem. Soc. 138, 2207, (1991)) $LiMn_2O_4$ (Ohzuku et al., J. Electrochem. Soc. 137, 769, (1990)) and $Li_2Mn_2O_4$ (Tarascon et al., J. Electrochem. 138, 2864 (1991)). $LiCoO_2$ and $LiNiO_2$ adopt a layered structure of space group R-3m. $LiMn_2O_4$ adopts the $AB_2O_4$ spinel structure with space group Fd3m. $Li_2Mn_2O_4$ as described in Tarascon et al., J. Electrochem. 138, 2864 (1991) is related to $LiMn_2O_4$ in structure, but it is not believed to be entirely air stable. It is our belief that said $Li_2Mn_2O_4$ is hence not useful as a practical cathode material for Lithium ion batteries.

Each of these cathode materials can reversibly react with a certain amount of lithium between reasonable cutoff voltages that might be used in a practical Lithium-ion cell. These cutoff voltages are most likely about 2.5 V and about 4.2 V versus metallic Li. The specific capacities of $LiCoO_2$, $LiNiO_2$ and $LiMn_2O_4$ between these voltage limits are about 140 mAh/g (J. N. Reimers and J. R. Dahn, J. Electrochem. Soc. 139, 2091 (1992) ), 170 mAh/g, (J. R. Dahn, U. von Sacken and C. A. Michael, Solid State Ionics 44, 87 (1990)), and 110 mAh/g (T. Ohzuku, M. Kitagawa and T. Hirai, J. Electrochem. Soc. 137, 769, (1990)).

Recently, Ohzuku et al, Chemistry Express, 7, 193 (1992), discovered a new type of $LiMnO_2$ prepared from LiOH·$H_2O$ and γ-MnOOH at moderate temperature. Ohzuku et al. mixed stoichiometric amounts of the above reactants and then pressed them into a pellet. Different pellets were then heated in flowing nitrogen for several hours at temperatures between 300° C. and 1000° C. to prepare a series of materials. For materials prepared at 1000° C., the powder diffraction pattern resembled that of orthorhombic $LiMnO_2$, (Dittrich and Hoppe, Z. Anorg. Allg. Chemie 368, 262 (1969)). At lower temperature, (eg. 450° C.) the patterns were different, consisting of Bragg peaks that could be assigned to $LiMnO_2$ (of which some were very broad) and other peaks from an impurity phase. Nevertheless, Ohzuku et. al showed that material prepared at moderate temperature (between 300° C. and 450° C. apparently) reversibly reacted with about 190 mAh/gram of lithium between 2.0 and 4.25 V when operated as a lithium-ion cell cathode would be. In this application we call the material prepared at temperatures below 450° C., (excluding the impurity phase) Low Temperature $LiMnO_2$ or LT-$LiMnO_2$.

Cobalt and nickel are both much more expensive than manganese. For this reason, it is very important to use manganese-based materials in a price sensitive battery product provided performance penalties compared to cobalt and nickel are not overly severe. The new material reported by Ohzuku et al. apparently represents a major improvement in specific capacity compared to $LiMn_2O_4$. However, $LiMn_2O_4$ delivers useable capacity at a higher voltage than LT-$LiMnO_2$. Thus both materials appear very attractive for use as lithium ion battery cathodes.

Low cost, simple synthesis methods for such manganese based compounds are therefore desirable. Acta Chemica Sinica, Vol 39, No. 8, page 711–716 discusses an ion exchange material, $LiMn_2O_4$, resulting from treatment of electrolytic $MnO_2$ in LiOH solution followed by a heating stage. The preparation of $LiMn_2O_4$ is also disclosed in U.S. Pat. No. 4,246,253 using a method involving sintering lithium carbonate and manganese dioxide at temperatures of 800°–900° C. It was shown in U.S. Pat. No. 4,828,834 that a preferred $LiMn_2O_4$ compound for use in rechargeable batteries could be prepared by reacting manganese dioxide with $Li_2CO_3$ at 400° C. or with LiI at 300° C. in nitrogen. Ohzuku et al. proposed a method for preparing LT-$LiMnO_2$ which involves pelletizing an intimate mixture containing $LiOH \cdot H_2O$ and heat treating. In all these cases, manganese compounds with substantial amounts of lithium were prepared. However in all cases, an intimate mixture of lithium salt and manganese oxide must be created prior to heat treatment. The actual incorporation of lithium by ion exchange into the manganese oxide disclosed in Acta Chemica Sinica is presumably low since there are few hydrogen atoms to exchange with. However, after merely evaporating away water from LiOH solution, a solid intimate mix of LiOH coated, partially exchanged manganese oxide would be obtained. Upon heating such a mix, a solid state reaction could be expected to occur between the residual LiOH and the partially exchanged manganese oxide. Thus, substantial lithiation could be achieved via the solid state reaction and not by ion exchange.

There are several possible problems with synthesis methods employing such solid state reactions of intimate mixes of solids. In order to make uniformly lithiated material it is important that the stoichiometry throughout is constant. A uniform reaction relies on the correct ratios of reactants being present on a local, small scale. Thus, uniformity of the reactant mix must be achieved on a very small scale. Purity problems can arise if the manganese compound is inadequately lithiated prior to heating fully, resulting in the formation of an undesired compound. Unreacted lithium salt can remain as an impurity. In some instances, the preferred Li salt reactant may be LiOH. However, this can readily convert to $Li_2CO_3$ in air. Thus exposure of the mixture to the normal atmosphere prior to finishing heat treatment may be undesirable. A method of dealing with this particular problem is disclosed in Japanese Kokai 04-115459, wherein $Li_2CO_3$ is converted to LiOH by introducing water vapour into the process air stream.

SUMMARY OF THE INVENTION

An improved method has been discovered for preparing certain transition metal oxide solid solution compounds having the general formula $B_xMO_2$ wherein B is an element that can be ion exchanged for hydrogen, M is a transition metal, and x is a number in the range from about 0.5 to 2. Specifically, M is selected from the group consisting of Mn, Fe, Ni, Co, V, Cr, and Sc. In particular, M can be Mn. B is an ion exchangeable element selected from the Group Ia elements of the periodic table (ie. including Li, Na, K, Rb, Cs) or from the group of alkaline earth elements (ie. including Ca, Mg). In particular, B can be Li.

Starting with a transition metal oxide hydroxide solid solution compound having the general formula $H_yMO_2$ wherein y is a number in the range from about 1 to 2, a substantial amount (ie. x) of an element B might be ion exchanged with the hydrogen therein. Thus, the structure of any intermediate ion exchanged solid soltion compound produced via such an ion exchange method remains essentially the same as the structure of the solid solution starting compound.

The ion exchange step of the invention is accomplished in the presence of water and involves an excess of the species to be ion exchanged (ie. B). The ion exchange can proceed more rapidly with increased temperature but must be accomplished at temperatures below the decomposition temperature of the starting solid solution compound. (Otherwise, the structure may be altered.) After the ion exchange is accomplished, the water and excess species of B is separated away and any hydrogen remaining in the intermediate ion exchanged solid solution compound can be removed via a simple drying step.

Thus, the method of the invention comprises the steps of (a) selecting a suitable transition metal oxide solid solution starting compound; (b) selecting a suitable salt of B such that an excess of x moles of B per mole of $H_yMO_2$ is provided; (c) preparing a mixture of the solid starting solution compound, the salt of B and water; (d) ion exchanging hydrogen ions for B in the solid solution starting compound at a temperature below the decomposition temperature thereof and while maintaining the presence of water such that an intermediate ion exchanged solid solution compound is produced having essentially the formula $H_{y-x}B_xMO_2$ and the structure of the solid starting solution compound; (e) separating the intermediate ion exchanged solid solution compound from the water and residual salt of B in the mixture; and (f) drying the intermediate ion exchanged solid solution compound to remove any remaining hydrogen.

Specifically, the ion exchange step can be accomplished using a mixture comprising a liquid aqueous solution of the lithium salt.

Primary or rechargeable batteries can be manufactured wherein at least a portion of one electrode comprises a solid solution material prepared according to the method of the invention.

In particular, the inventors have discovered that $LiMn_2O_4$ and LT-$LiMnO_2$ for use in such batteries can be prepared in appreciably pure form using a simple two stage process of the invention. The first stage of the process, the lithiation stage, is accomplished via low temperature ion exchange in aqueous warm salt solution. The second stage involves a drying and/or heat treatment step for the removal of hydrogen as water and/or for structural rearrangement. (The structure of the ion exchanged intermediate as prepared has to be rearranged afterwards to produce $LiMn_2O_4$.) A key to the process is the use of a suitable starting material with the proper initial structure and sufficient inserted ion already present such that it can be exchanged with the total amount of lithium desired in the final compound. The other key is that the exchange process requires a solvent, in this case water. Thus no intimate mix of solid Li salt and manganese compound is required as an intermediary step with its corresponding drawbacks. Since other chemically similar starting materials are known to exist, the inventors expect that this method would be applicable to the synthesis of other solid solution materials, especially other Li manganese oxide phases, of interest for use in batteries as well.

Both $LT-LiMnO_2$ and $LiMn_2O_4$ have been synthesized using this novel process and using $\gamma$-MnOOH as the starting material. Lithiation was accomplished by boiling solid $\gamma$-MnOOH particles in sufficient (ie. excess Li present) 4M LiOH solution. During the boiling, an ion exchange reaction occurs:

$\gamma$-MnOOH+LiOH→LT-$Li_xH_{1-x}MnO_2$+$H_2O$

The initial molarity and volume of the LiOH solution which is added per unit mass of $\gamma$-MnOOH can be used to adjust the extent of lithiation and to minimize the amount of LiOH which remains in the solution after reaction. Predominantly complete ion exchange is possible. After sufficient time, the suspended LT-$Li_xH_{1-x}MnO_2$ particles are recovered from the solution by filtering or settling or centrifugation. The material can then either be rinsed with pure $H_2O$ to remove excess LiOH, if any, or left unrinsed. Some reverse ion exchange can occur if rinsing is used. This can be used to adjust the extent of lithiation if desired (ie. decreasing the extent of lithiation). The powder is then dried by heating at temperatures between 100° C. and 350° C. in either vacuum or inert gas. Heating above 350° C. may be used if structural rearrangement is desired. This represents a substantial simplification compared to the method of Ohzuku et al. in the preparation of $LT-LiMnO_2$.

In the preparation of $LT-LiMnO_2$, it is thought to be important that the ion exchange reactions be completed at temperatures below about 220° C. The reason is that $\gamma$-MnOOH decomposes above this temperature to form $Mn_2O_3$ and water. For rapid ion exchange reactions, involving the $\gamma$-MnOOH framework, it is essential that this framework not be destroyed. Therefore it is most desirable to perform these ion exchange reactions below about 220° C.

Lithium/LT-$LiMnO_2$ test cells constructed with such materials give reversible capacities between 2.5 and 4.2 V of more than 170 mAh/g. Once the powders are heated to 450° C. or above, the reversible cell capacity drops dramatically (to about 60 mAh/g for material heated at 450° C.). This reduction coincides with changes to the x-ray diffraction profile of the material with heating. Between 350° C. and 450° C., the crystallinity of $LT-LiMnO_2$ improves dramatically, apparently reducing the reversible capacity.

DETAILED DESCRIPTION OF SPECIFIC EMBODIMENTS OF THE INVENTION

Figure 1:
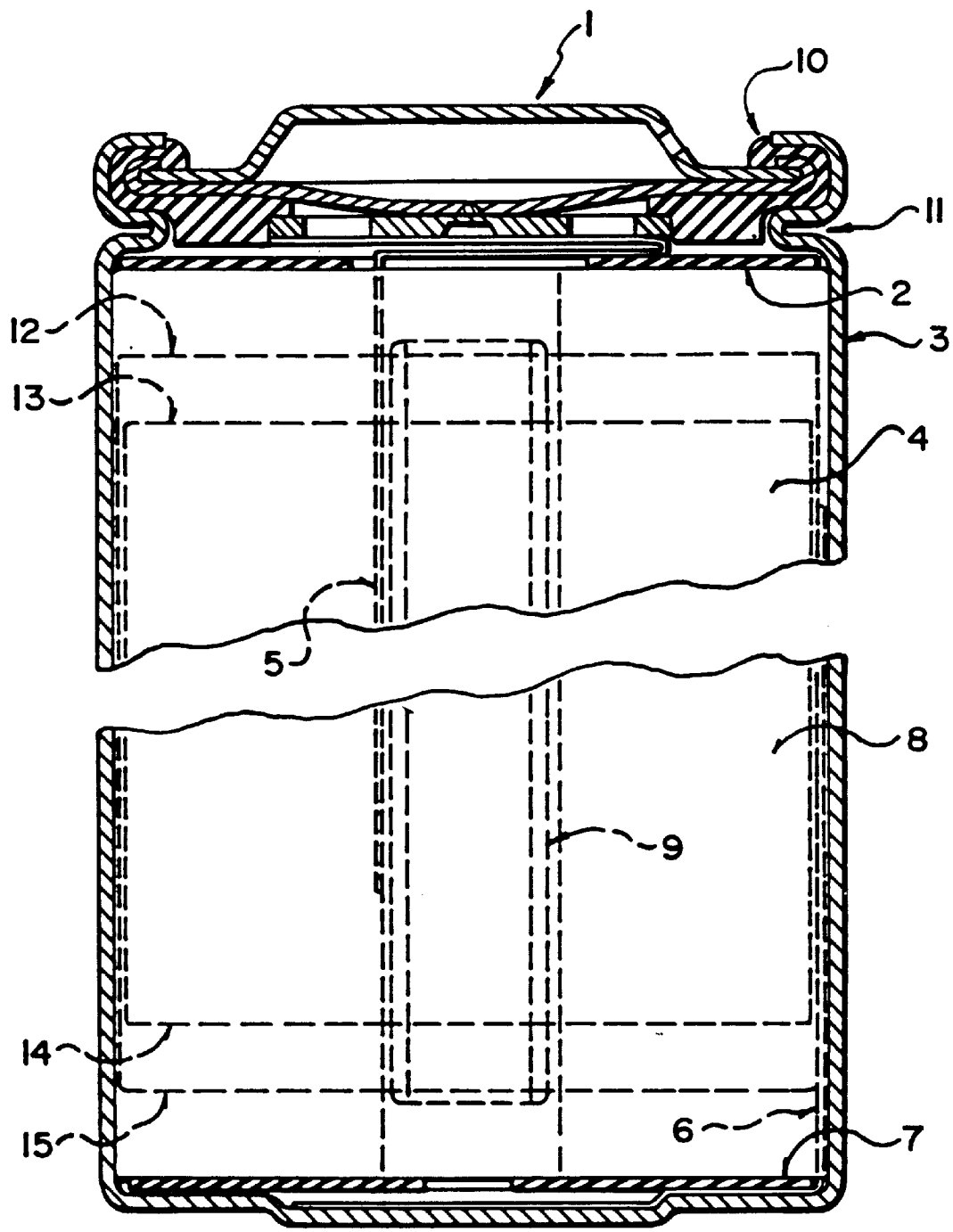
FIG. 1 shows a preferred construction of a rechargeable lithium ion battery incorporating a cathode material prepared using the invention process.

In the following, solid solution materials containing a uniformly dispersed mixture of one or more solid substances at the ionic level are normally referred to as compounds having a general formula $A_xB_yMO_z$ where x, y, and z are variables which refer to the ranges of elements A, B, and O present with respect to the element M. Valence restrictions limit the theoretical ranges possible for these parameters. A person skilled in the art will understand the interdependence of and the absolute ranges possible for these parameters. Also in the following, the term low temperature is used to mean below about 300° C. to clearly distinguish it from the prior art.

Ion exchange is defined by Grimshaw and Harland, ("Ion Exchange: Introduction to Theory and Practice" Published by: The Chemical Society, London, England, 1975), as "the reversible interchange of ions between a solid phase (the ion-exchanger) and a solution phase; the ion-exchanger is usually insoluble in the medium in which the ion exchange is carried out". If an ion exchanger $M^-A^+$ carrying $A^+$ cations is placed in an aqueous solution containing $B^+$, an ion exchange reaction takes place represented by the following equation:

$$M^-A^+(solid)+B^+(solution) \leftrightarrow M^-B^+(solid)+A^+(solution).$$

The anion in solution usually does not take place in the exchange to any appreciable extent. In the examples of this invention, M can be identified with MnOO, A with H, and B with Li.

Ion exchange reactions are generally topotactic. In this relatively gentle reaction, the structure of the framework is retained while mobile ions of one type ($H^+$ in the examples to follow) are exchanged for those in high concentration in solution ($Li^+$ in the examples). Therefore, one can expect the structure of the ion exchanged product to mirror that of the starting reactant. MnOOH exists in three well documented forms. There is the γ-MnOOH form used here, called manganite, described in M. J. Buerger, Zeitschrift fur Kristallographie 95, 163 (1936), and in D. Glover, B. Schumm, Jr. and A. Kozawa, "Handbook of Manganese Dioxides, Battery Grade" Published by the International Battery Materials Association (1989) page 6, which shows structural similarity to orthorhombic $LiMnO_2$. There is α-MnOOH, called groutite, and β-MnOOH called Feitknechtite (D. Glover, B. Schumm, Jr. and A. Kozawa, "Handbook of Manganese Dioxides, Battery Grade" Published by the International Battery Materials Association (1989) page 6, and/or Owen Bricker, The American Mineralogist, 50, 1296 (1965). The former takes a ramsdellite-type structure and the latter is apparently a layered structure like $Mn(OH)_2$. The inventors expect the synthesis methods to be applicable to each of these MnOOH starting materials and that useful materials as cathodes in Li-ion cells will be produced. Furthermore, it is likely that $Mn(OH)_2$ can also be ion-exchanged using our methods, again producing useful electrode materials for Li-ion cells. A summary of present and expected results is shown in the following table.

| Starting Materials | α-MnOOH | β-MnOOH | γ-MnOOH | $Mn(OH)_2$ |
|---|---|---|---|---|
| Common Name | Groutite | Feiknechtite | Manganite | Manganese Hydroxide |
| Structure Type | Ramsdellite | Layered | Manganite | $Cd(OH)_2$ Type |
| After Ion Exchange | ? (X-phase Type) | ? | $LT-Li_xH_{1-x}MnO_2$ | ? ($Li_2NiO_2$-Type) |
| After Drying and/or Heating Becomes | ? | ? | $LT-LiMnO_2$, for $x > 0.9$ $LiMn_2O_4$, for $x \approx 0.5$ | ? |

Lithium manganese oxide is prepared using a two-stage process. γ-MnOOH obtained from Chemetals (Baltimore, Md., USA) and $LiOH \cdot H_2O$ obtained from FMC (Bessemer City, N.C., USA) were used as reactants. Lithiation was accomplished by stirring γ-MnOOH in aqueous LiOH solution at about 100° C. in a refluxing set-up. A variety of post-lithiation treatments to dry the powder can be employed and include filtering, settling, and, centrifuging in addition to heating. Heating is performed in tube furnaces equipped with stainless steel furnace tubes above 120° C. The ends of the furnace tubes could be closed by flanges with gas flow or vacuum fittings so that heating could be done under air, inert gas, or vacuum.

Primary or rechargeable lithium batteries are then constructed employing the lithium manganese oxide material as a cathode material (either as the major component or as an additive). A preferred construction is that of a wound type Li ion rechargeable battery shown in FIG. 1. Cathode foils are prepared using lithium manganese oxide powder, a binder, and a conductive dilutant mixture applied to a thin aluminum foil. Anode foils are prepared using suitable carbonaceous compound mixtures and a binder applied to a thin copper foil. A dry cell assembly 4 is then prepared by spirally winding an anode and cathode segment together into a "jelly roll" with two microporous polyolefin film sheets acting as separators. Typically, anode foils are slightly wider than the cathodes as indicated by anode edges 12, 15 and cathode edges 13, 14 in FIG. 1. The "jelly roll" is inserted into conventional cylindrical battery containers 3. Appropriate insulating pieces 2, 7 are included and tab connections 5, 6 are made to the cell case 3 and header 1. Safety devices may be included as desired. FIG. 1 shows the use of a combination safety vent and pressure operated disconnect device (in the header 1) that may be employed. Electrolyte 8 consisting of a suitable lithium salt in a mixture of non-aqueous solvents is added to activate the battery prior to crimping the header-case assembly shut.

For illustrative and/or comparative purposes, other lithium manganese oxide samples were synthesized in the examples to follow using the same reactants and a conventional synthesis method. Pellets of mixed $LiOH \cdot H_2O$ and γ-MnOOH powders were made using a hardened steel pellet press operated with a pressure on the powders of about 1000 bar. A Retsch Model RM-0 automatic grinder was used to thoroughly mix the reactants. Heating of the pellets was performed using the same apparatus and methods employed in the invention process.

In the examples to follow, a Phillips powder diffractometer equipped with a Copper target x-ray tube and a diffracted beam monochrometer was used for diffraction measurements. A TA instruments Model 951 thermogravimetric analyzer was used when monitoring the reaction between $LiOH \cdot H_2O$ and γ-MnOOH solids.

Figure 2:
FIG. 2 shows the construction of the laboratory test cell employed to illustrate the electrochemical behaviour of example materials.
Figure 2:
Figure 2:
Figure 2:
Figure 2:
Figure 2:
Figure 2:
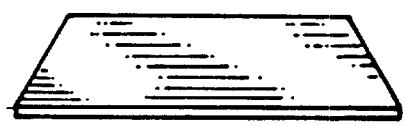
Figure 2:
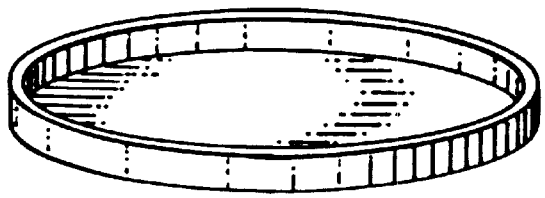

Laboratory test cells were employed to illustrate the electrochemical behaviour of the lithium manganese oxide cathode materials that were prepared. These cells used an anode of lithium metal which acts as a useful reference electrode for this purpose. The information provided from such cells allows those skilled in the art to engineer suitable lithium ion batteries with these materials as cathodes. The laboratory test cells were constructed as shown in FIG. 2. 2325 size coin cell hardware comprising negative container 21, gasket 22, and positive container 30, equipped with a spacer plate 24 (304 stainless steel) and a disc spring 23 (mild steel) was used as the test vehicle. A special corrosion resistant grade of stainless steel was used for the positive container hardware 30 to prevent oxidation. The disc spring 23 was selected so that a pressure of about 15 bar would be applied to each of the cell electrodes (anode 25 and cathode 27) when the cell was crimped closed. 125 μm thick Li foil was used as the anode 25 in these cells. The separator 26 was Celgard® 2502 microporous film which had been wetted with electrolyte 28 consisting of 1M $LiPF_6$ dissolved in a 50/25/25 volume percent mixture of dimethyl carbonate, propylene carbonate and ethylene carbonate respectively. Cathodes 27 were made from the lithiated manganese oxide powder, Super S carbon black (10% by weight) and polyvinylidene (PVDF) binder, uniformly coated on aluminum foil. The lithiated manganese oxide and the carbon black were added to a solution of 20% PVDF in N-methylpyrollidinone (NMP) such that 10% of the final electrode mass would be PVDF. Excess NMP was then added until the slurry reached a smooth syrupy viscosity.

The slurry was then spread on the Al foil using a doctor blade spreader and the NMP evaporated at about 90° C. in air. Once the electrode stock was dried it was compressed between flat plates at about 25 bar pressure. Test electrodes of dimension 1.2 cm×1.2 cm were then cut from the electrode stock using a precision cutting jig. These electrodes were then weighed and the weight of the foil, the PVDF and the carbon black were subtracted to obtain the active electrode mass.

All cell construction and sealing was done in an Argon-filled glove box. After construction, the cells were removed from the glove box and cycle tested using constant current cyclers. Currents were adjusted to be 5.7 mAh/gram of active material.

COMPARATIVE EXAMPLES

Example 1

Figure 3:
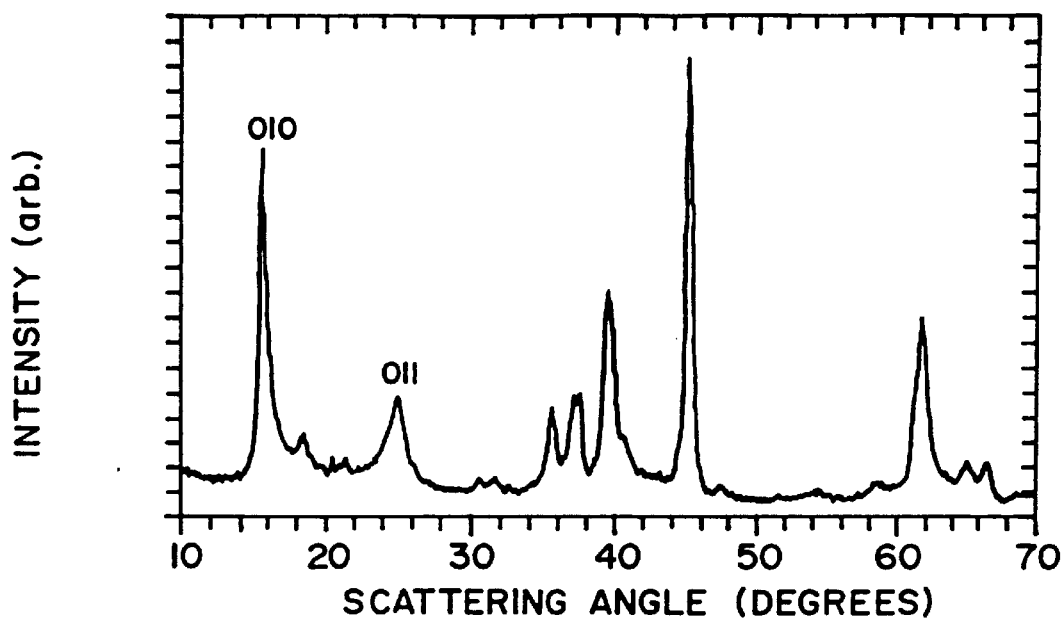
FIG. 3 shows the powder X-ray diffraction pattern of $LT-LiMnO_2$ prepared in comparative example 1.

6.554 g γ-MnOOH and 3.445 g LiOH·$H_2O$ were thoroughly mixed together using the automatic grinder. A 10% atomic stoichiometric excess of Li was included, ie: the Li:Mn ratio in the mixture was 1.1:1. After mixing, the powders were pressed into a pellet at 1000 bar pressure. The pellet was then tightly wrapped in Ni foil. The wrapped pellet was placed in an alumina boat and then heated under flowing argon for 18 hours at 350° C. After heating it was reduced to powder by grinding and analyzed by x-ray diffraction. FIG. 3 shows the diffraction pattern obtained. This pattern agrees well with that of similar material prepared by T. Ohzuku et al., J. Electrochem. Soc. 137, 769, (1990). (shown in this article's FIG. 1) except that, in their work, the impurity peak near 18°, belonging to the pattern for $LiMn_2O_4$, is of equal height to the 011 peak at 24.5°. (Note that the data in this reference was collected using Fe Kα radiation, so the angles there must be corrected to correspond to those for Cu Kα. This is done using standard methods (B. D. Cullity, "X-Ray Diffraction", Addison-Wesley, 1969). Table 1 gives the Bragg Peak positions and integrated peak intensities for $LiMnO_2$ as prepared at about 1000° C. (Dittrich and Hoppe, Z. Anorg. Allg. Chemie 368, 262 (1969)). Although $LiMnO_2$ prepared at this temperature is not electrochemically equivalent to compounds of similar stoichiometry prepared at lower temperatures, the x-ray patterns are similar enough for purposes of identifying impurity related peaks in the patterns. From a comparison of FIG. 3, Table 1 and said reference, it is clear that the material prepared by the invention methods is more pure than that of said Ohzuku et al. reference.

TABLE 1

LITERATURE DIFFRACTION PATTERN FOR $LiMnO_2$

| MILLER INDICES | SCATTERING ANGLE | RELATIVE INTENSITY |
|---|---|---|
| 010 | 15.264 | 50 |
| 011 | 24.571 | 56 |
| 110 | 35.408 | 23 |
| 021 | 36.742 | 18 |
| 101 | 37.360 | 12 |
| 002 | 39.169 | 75 |
| 111 | 40.605 | 39 |
| 012 | 42.401 | 20 |
| 120 | 44.902 | 100 |
| 030 | 47.227 | 7 |
| 102 | 51.501 | 8 |
| 112 | 53.989 | 17 |
| 130 | 58.113 | 18 |
| 122 | 61.344 | 95 |

TABLE 1-continued

LITERATURE DIFFRACTION PATTERN FOR $LiMnO_2$

| MILLER INDICES | SCATTERING ANGLE | RELATIVE INTENSITY |
|---|---|---|
| 131 | 62.027 | 29 |
| 032 | 63.106 | 10 |
| 040 | 64.777 | 20 |
| 200 | 66.708 | 21 |
| 210 | 68.881 | 11 |

Figure 4:
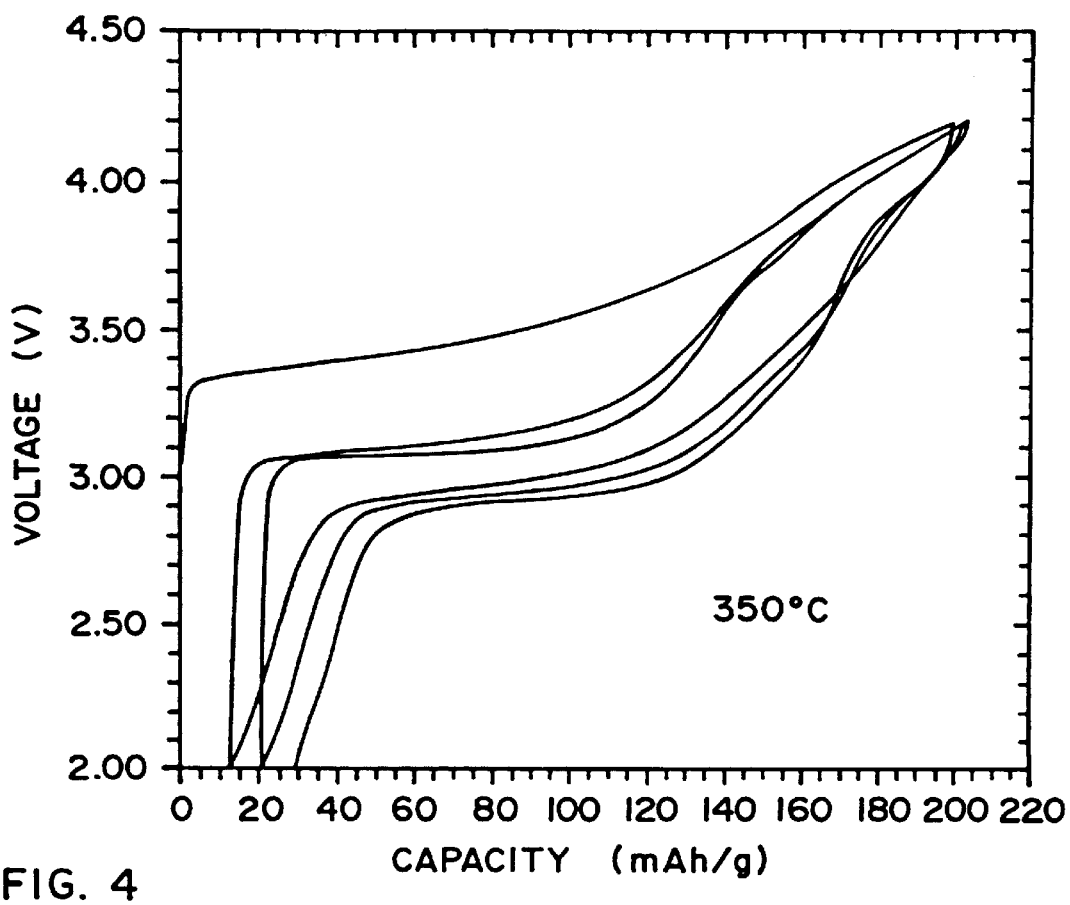
FIG. 4 shows the voltage versus capacity curves for a laboratory test cell using a lithium anode and a cathode of the material prepared in comparative example 1.

A Li/LT-$LiMnO_2$ test cell was assembled from this powder. The cell was charged and discharged using currents of 5.7 mA/g. The cell voltage versus capacity for the first three cycles is shown in FIG. 4. The specific reversible capacity for this cell over the first three cycles is greater than 170 mAh/g between 2.0 and 4.2 V. Other similar cells obtained equal or better performance. This performance is equal to that shown in said reference (FIG. 2 in this reference). Similar cells cycled between 2.0 and 3.8 V at the same specific current obtained 120 mAh/g of reversible capacity for over 30 charge discharge cycles.

Example 2

X-ray pattern information for $LiMn_2O_4$ was obtained from the literature (Natl. Bureau of Standards (U.S.) Monograph 25, 2178, (1984) and Joint Commission on Powder Diffraction Standards (JCPDS) reference database. Peak positions and relative intensity are shown in Table 2.

TABLE 2

LITERATURE DIFFRACTION PATTERN FOR $LiMn_2O_4$

| MILLER INDICES | SCATTERING ANGLE | RELATIVE INTENSITY |
|---|---|---|
| 111 | 18.611 | 100 |
| 220 | 30.650 | 1 |
| 311 | 36.085 | 38 |
| 222 | 37.747 | 10 |
| 400 | 43.869 | 33 |
| 331 | 48.047 | 7 |
| 511 | 58.056 | 10 |
| 440 | 63.780 | 16 |
| 531 | 67.079 | 7 |

Figure 5:
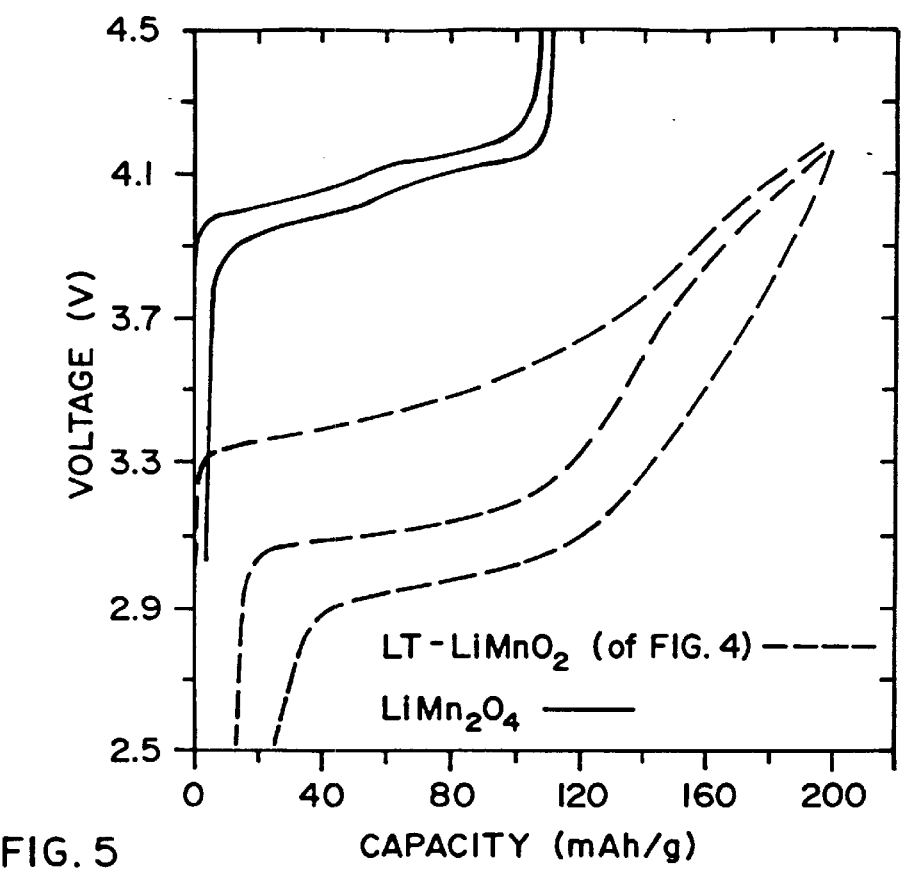
FIG. 5 shows the voltage versus capacity curve for a laboratory test cell using a lithium anode and a cathode of the material used in comparative example 2 plus the curve of FIG. 4 for comparison.

A Li/$LiMn_2O_4$ test cell was prepared using $LiMn_2O_4$ (from Cyprus-Foote Mineral Corp., Exton, Pa., USA) and the methods described earlier. FIG. 5 shows the voltage-capacity relation for this cell compared to that used for FIG. 4. The data for the $LiMn_2O_4$ cell are in good agreement with those in the literature (T. Ohzuku et al., J. Electrochem. Soc. 137, 769, (1990). This shows the capacity advantage of LT-$LiMnO_2$ over $LiMn_2O_4$.

These two examples illustrate the electrochemical behaviour of LT-$LiMnO_2$ and $LiMn_2O_4$, that prior art methods can be successfully duplicated, and that the laboratory cell assembly and testing techniques are sound. However, in the case of LT-$LiMnO_2$, the heating temperature selected was above the apparent decomposition temperature of γ-MnOOH (see later in Illustrative Example 1).

INVENTION EXAMPLES

Example 1

Figure 6:
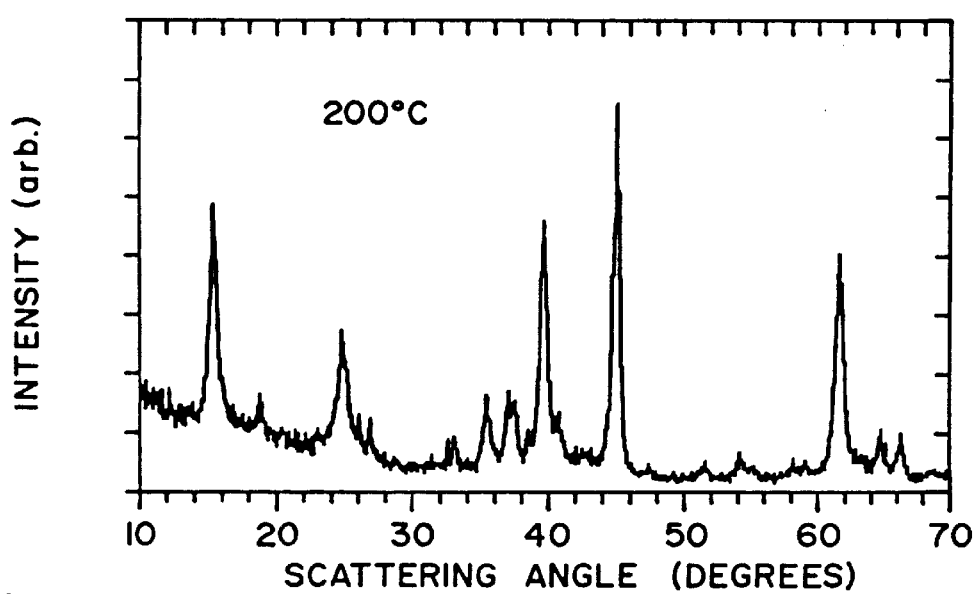
FIG. 6 shows the powder X-ray diffraction pattern of $LT-LiMnO_2$ prepared in invention example 1.

5.0 grams of γ-MnOOH were refluxed under boiling conditions in 100 mls of 4M LiOH solution for 6 hours. Thus there were more moles of Li present in the solution than H in the MnOOH. Some of the suspension was poured into a centrifuge tube and settled by centrifugation. The liquid was then decanted, leaving minimal residual salt solution behind, and the resulting wet powder directly heated in an alumina boat to 200° C. in flowing argon. FIG. 6 shows the x-ray diffraction pattern for this material showing that it is basically identical in a structural sense to the materials shown in comparative Example 1 (ie. LT-LiMnO$_2$), even though it has been prepared under strikingly different conditions.

Figure 7:
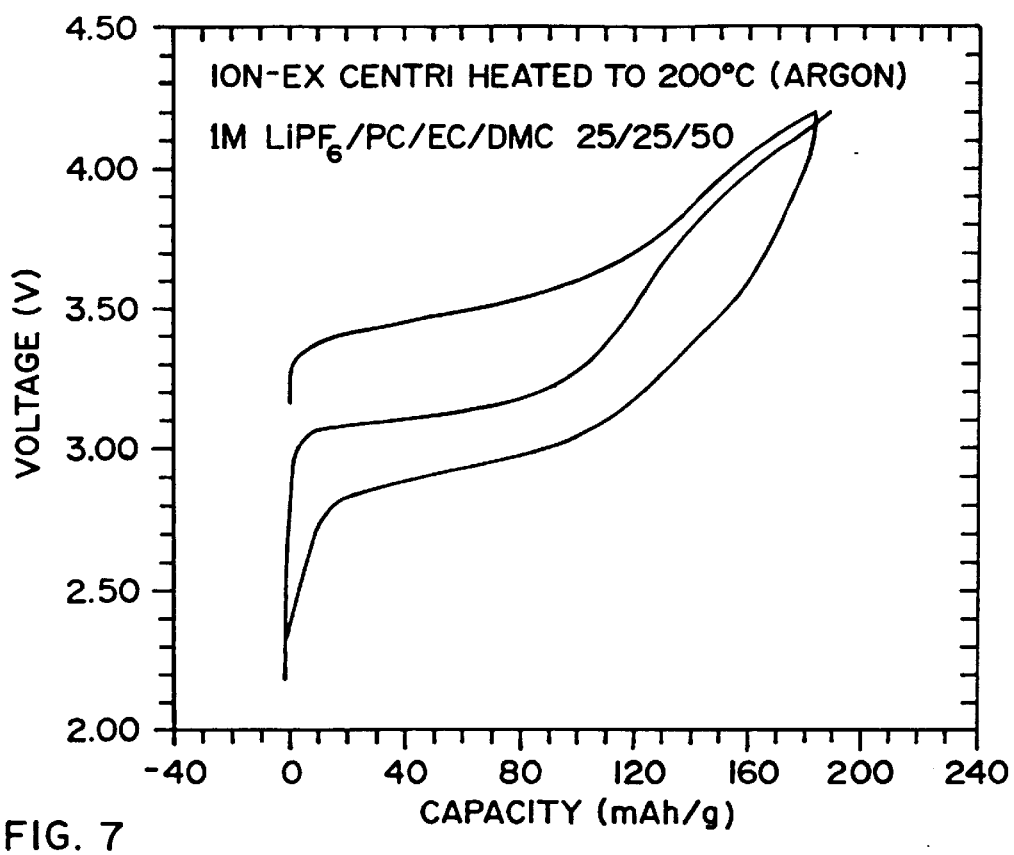
FIG. 7 shows the voltage versus capacity curves for a laboratory test cell using a lithium anode and a cathode of the material prepared in invention example 1.

A Li/LiMnO$_2$ test cell was prepared from this material. FIG. 7 shows the voltage-capacity relation for this cell, which obtains 180 mAh/g between 4.2 and 2.0 V. Thus this sample is similar to the LT-LiMnO$_2$ of Comparative Example 1.

This example demonstrates that excellent LT-LiMnO$_2$ material for use as cathodes in lithium batteries can be made using the invention process. Material similar to that described in the prior art can be prepared at temperatures as low as 200° C.

Example 2

Figure 8:
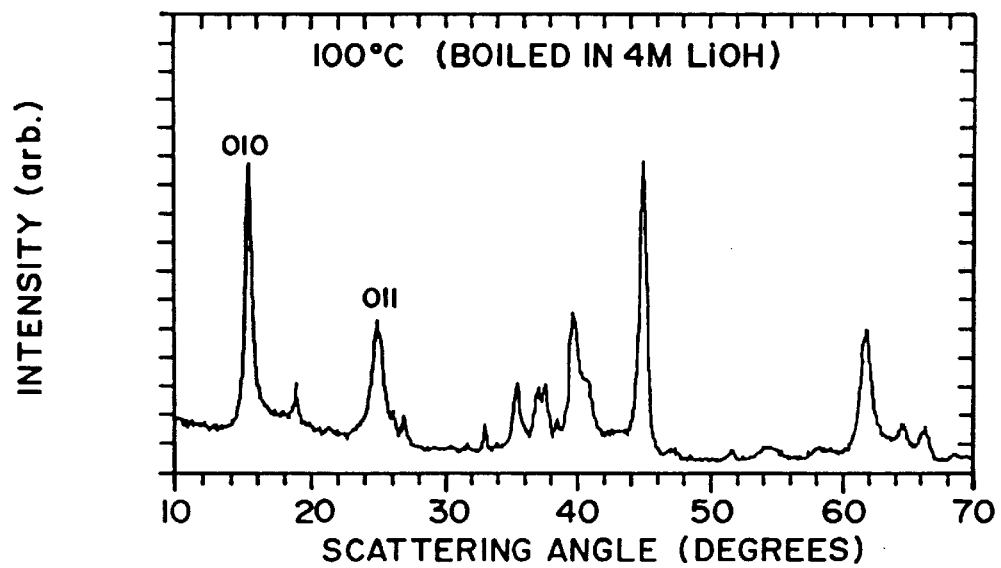
FIG. 8 shows the powder X-ray diffraction pattern of $LT-Li_xMnO_2$ prepared in invention example 2.

3.0 grams of γ-MnOOH was added to 100 mls of 4M LiOH solution. The mixture was refluxed by boiling for 6 hours. The solids were collected by filtering, and rinsed in water several times. The resulting powder was dried at 120° C. in vacuum. FIG. 8 shows the diffraction pattern for this sample. A comparison with FIG. 3 shows that a structurally identical product (apart from small impurity peaks near 18.7, 26, 26.9, 33.1 and 38.6 degrees) has been prepared. Thus this sample is structurally identical to LT-LiMnO$_2$.

Figure 9:
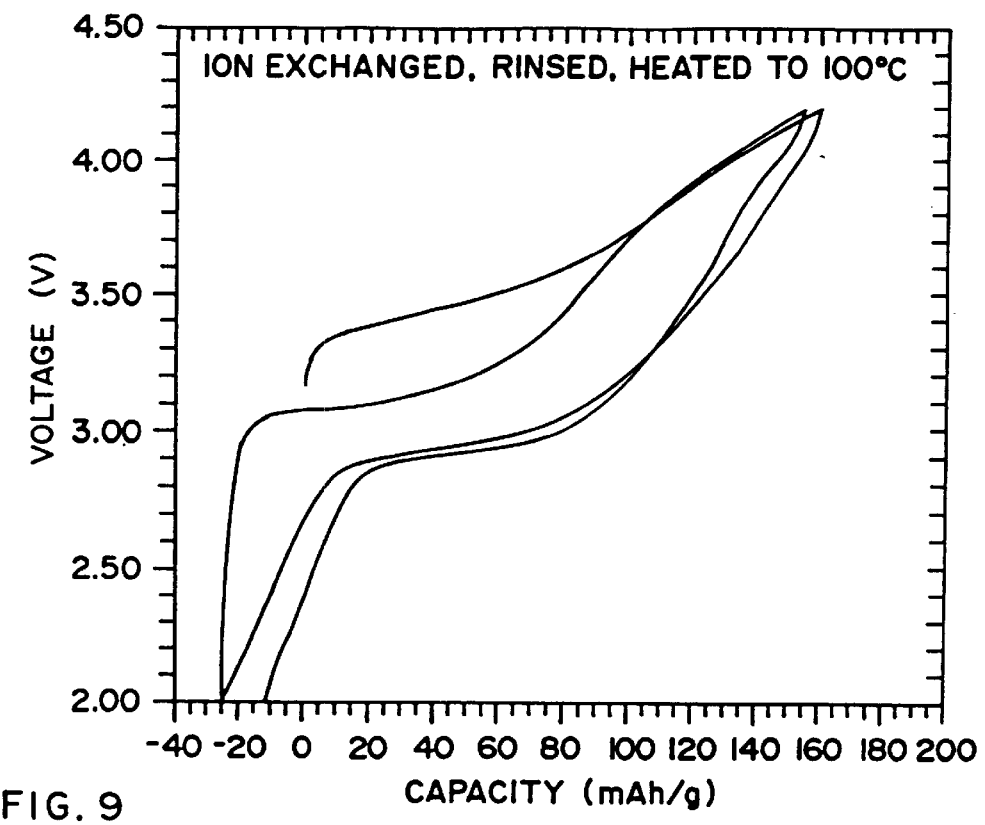
FIG. 9 shows the voltage versus capacity curves for a laboratory test cell using a lithium anode and a cathode of the material prepared in invention example 2.

A test cell was prepared using this material. FIG. 9 shows the voltage-capacity relation for this cell. This cell obtains 190 mAh/g between 4.2 and 2.0 V after the first charge in good agreement with the cells described in comparative example 1. However, the capacity of the first charge itself is only about 160 mAh/g showing that insufficient Li has been incorporated in the material by the ion exchange followed by rinsing in water. Some Li was removed by "reverse ion-exchange" with hydrogen during the rinsing steps. Therefore, this material must be considered Li$_x$H$_{1-x}$MnO$_2$ with x near 0.88 after this rinsing.

This example demonstrates a means of varying the degree of lithiation while otherwise preparing the same material. Here, it appears that a sample of LT-Li$_x$MnO$_2$, wherein x is close to 1, is first produced after the refluxing. However, x is subsequently reduced to about 0.88 as a result of the rinsing done. An intermediate ion exchanged solid solution compound of formula about LT-Li$_{0.88}$MnO$_2$ presumably was produced after the rinsing. After removing the hydrogen by vacuum drying, an LT-Li$_{0.88}$MnO$_2$ product is then presumably produced. Those of ordinary skill in the art will appreciate that x can likely be varied downwards in a continuous fashion in this way.

Example 3

Figure 10:
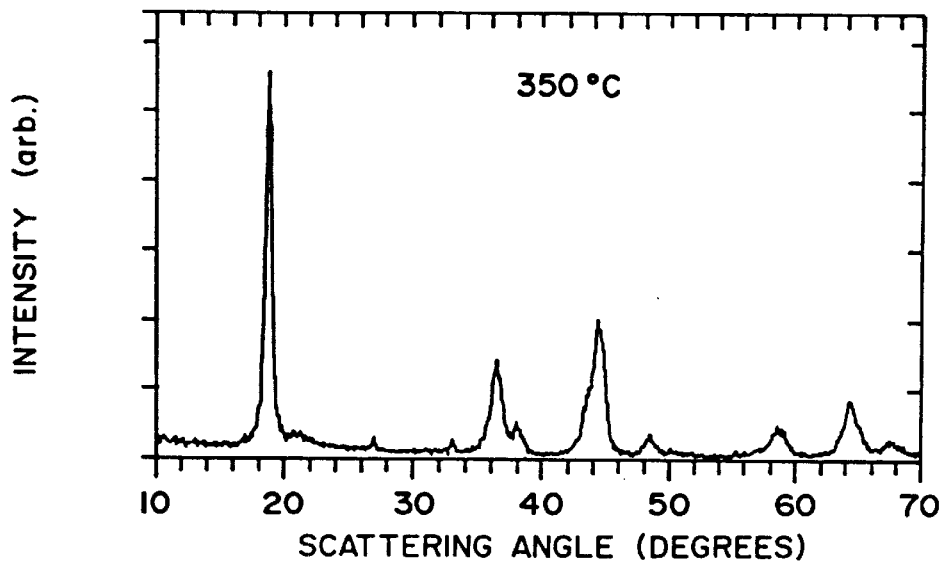
FIG. 10 shows the powder X-ray diffraction pattern of $LiMn_2O_4$ prepared in invention example 3.

The material of inventive example 2 was further heated to 350° C. in argon for 18 hours. The diffraction pattern for this material is given in FIG. 10. This pattern no longer resembles that of the LiMnO$_2$ phase prepared in comparative example 1 and inventive examples 1 and 2. Instead this pattern is close to that of LiMn$_2$O$_4$ shown in comparative example 2. Thus this sample has undergone structural rearrangement. It is presumably possible therefore to prepare LiMn$_2$O$_4$ and other Li-Mn-O compounds at low temperatures by preparing the "right" intermediate Li$_x$H$_{1-x}$MnO$_2$ compound by controlled ion exchange followed by a suitable drying and heat treatment. In this case, a product which contains LiMn$_2$O$_4$ as indicated by X-ray diffraction analysis (equivalent to Li$_x$MnO$_2$ wherein x=0.5) has been prepared by structurally rearranging the LT-Li$_x$MnO$_2$ sample of Inventive Example 2. x was estimated to be about 0.88 in Inventive Example 2 so the product here cannot be pure LiMn$_2$O$_4$ (equivalent to Li$_{0.5}$MnO$_2$). However, those skilled in the art will appreciate that if LT-Li$_{0.5}$MnO$_2$ were prepared in a manner similar to the Li$_{0.88}$MnO$_2$ of Inventive Example 2, then relatively pure LiMn$_2$O$_4$ spinel might be prepared therefrom by heating further to 350° C., as in this Example.

ILLUSTRATIVE EXAMPLES

Example 1

6.554 g γ-MnOOH and 3.445 g LiOH·H$_2$O were thoroughly mixed together using the automatic grinder. After mixing, about 0.1 gram of the mixture was pressed together at 1000 bar as in comparative example 1. Two small pieces of pellet (about 30 mg) were broken off and wrapped in a small piece of Al foil having known weight. The wrapped pieces were then subjected to TGA analysis at two different heating rates under flowing argon. One run was @ 1° C./min and the other was @ 10° C./min.

Next, Anhydrous LiOH and γ-MnOOH were mixed in a 1:1 stoichiometric ratio by grinding for 5 minutes. The mixture was pressed into a pellet at 1000 bar as before. A small piece of this pellet was wrapped in a known mass of aluminum foil and then subjected to TGA analysis under an argon atmosphere.

Figure 11:
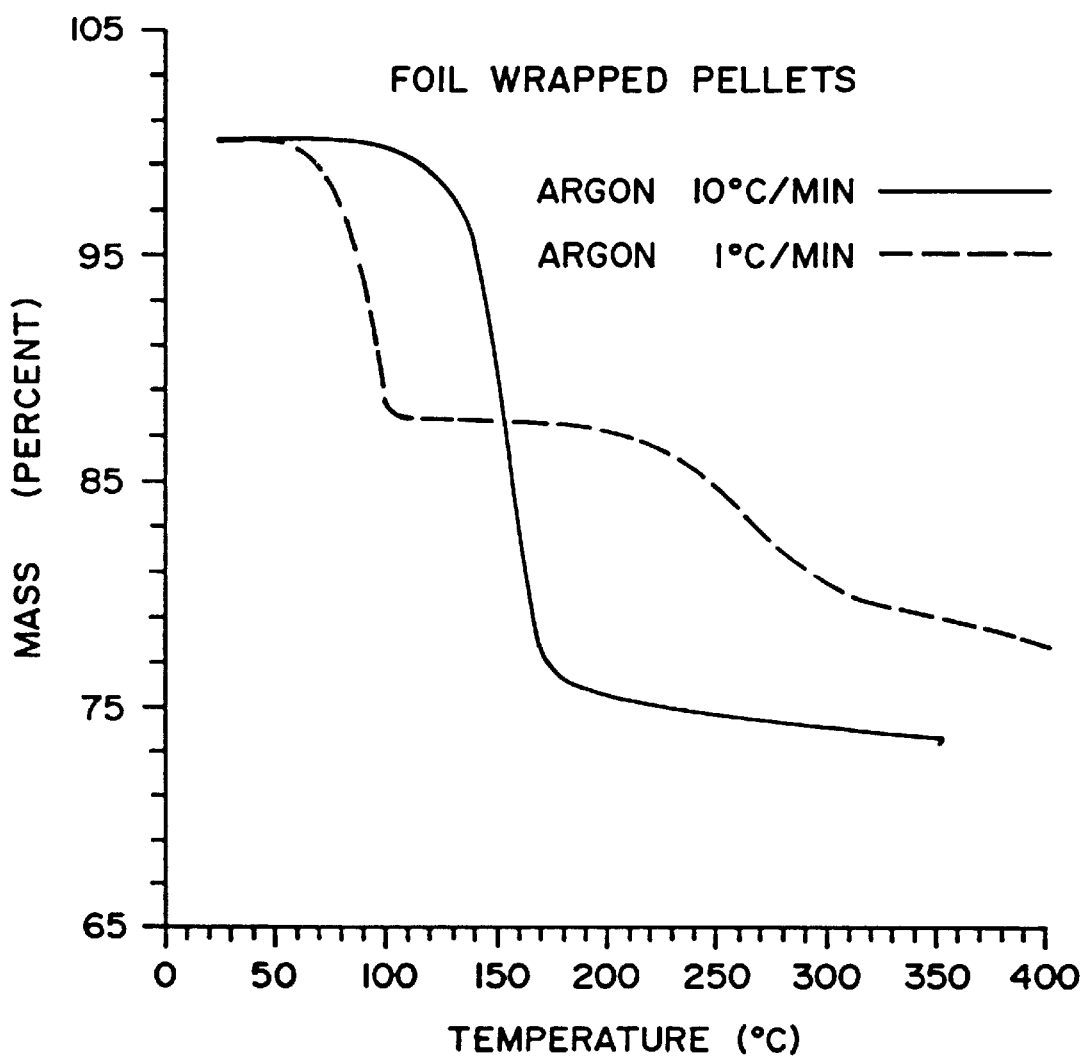
FIG. 11 shows the thermogravimetric data for foil wrapped pellets tested at different heating rates in illustrative example 1.

FIG. 11 shows the weight loss versus temperature for both the TGA analyses on material prepared using LiOH·H$_2$O. At 10° C./min heating rate, the reaction between LiOH·H$_2$O and γ-MnOOH occurs in a single event beginning just over 100° C. in this analysis and ending near 170° C. The water of hydration of LiOH·H$_2$O does not leave until over 100° C. due to the foil wrapping. Thus there is water present to facilitate the ion exchange reaction to form LT-LiMnO$_2$. At 1° C./min heating rate, there is extensive weight loss before 100° C., as the water of hydration of LiOH·H$_2$O is lost through the cracks in the foil wrapping since the time taken to reach 100° C. is ten times longer. In T. Ohzuku et al., J. Electrochem. Soc. 137, 769, (1990), foil wrapping was not specified. This omission leads to early water loss at the exterior of the pellet and then to incomplete ion exchange at low temperature.

Figure 12:
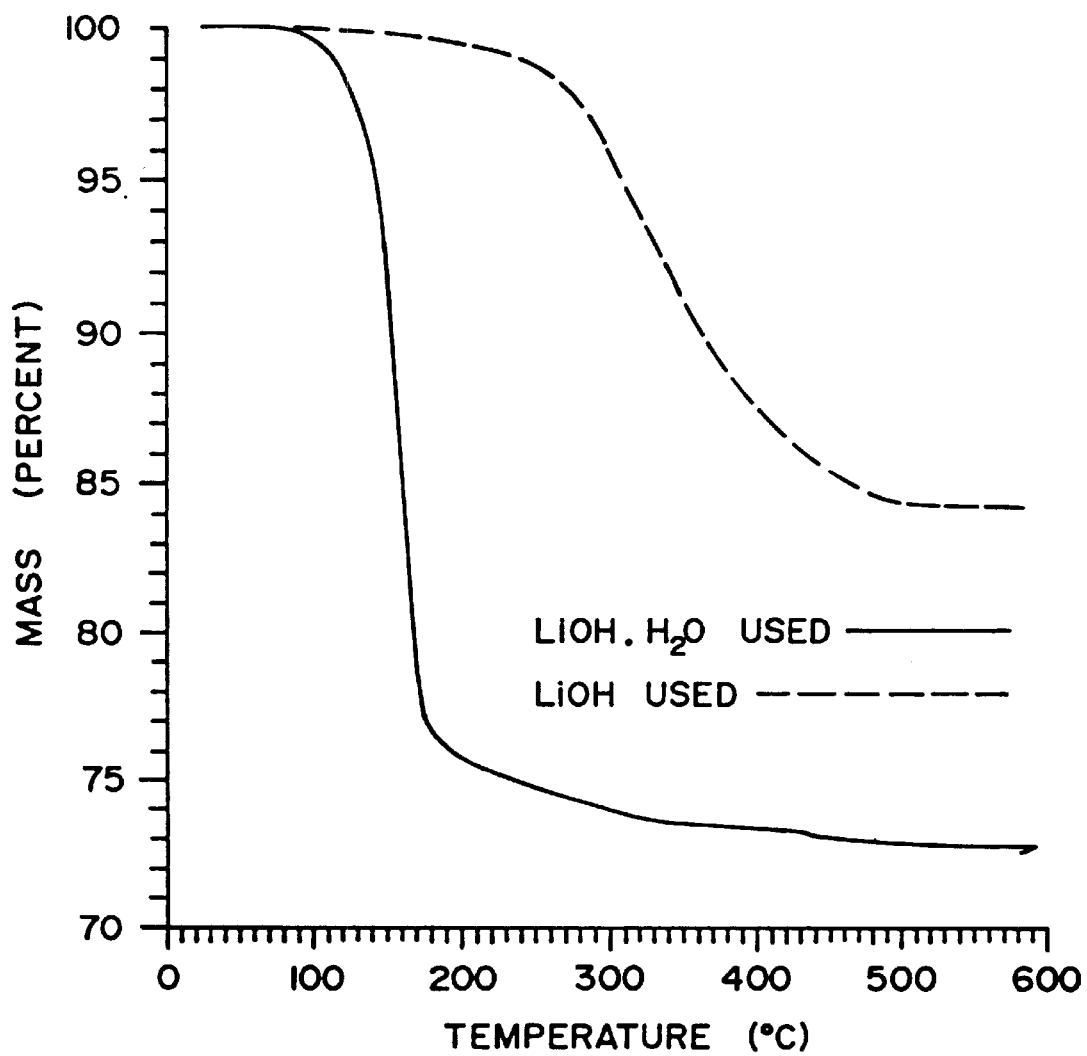
FIG. 12 shows the thermogravimetric data for foil wrapped pellets prepared with anhydrous LiOH or $LiOH.H_2O$ in illustrative example 1.
Figure 13:
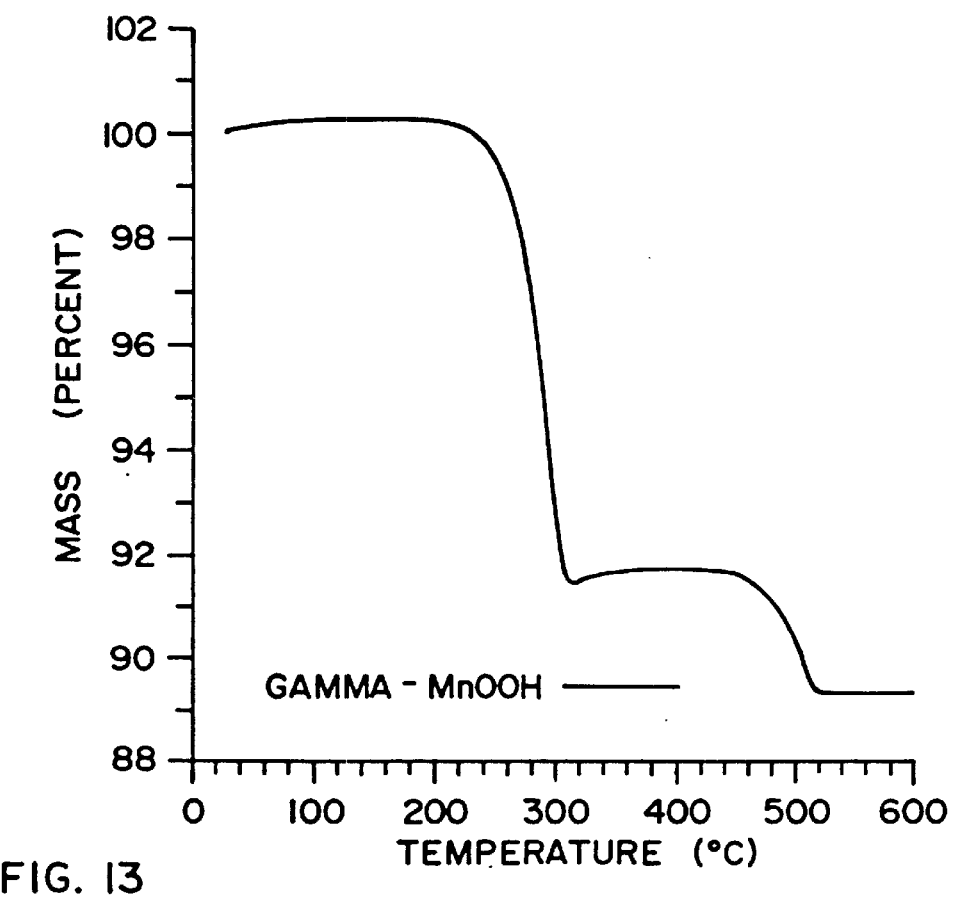
FIG. 13 shows the thermogravimetric data for $\gamma$-MnOOH by itself as tested in illustrative example 1.

This phenomena is demonstrated further in comparing this to the results obtained with anhydrous LiOH and γ-MnOOH where the reaction doesn't begin until over 220° C. FIG. 12 shows TGA analyses of the LiOH·H$_2$O sample and anhydrous LiOH sample both heated at 10° C./min rate. At 220° C., γ-MnOOH begins to decompose as is shown on a similar TGA analysis on γ-MnOOH by itself in FIG. 13. Neither the anhydrous LiOH sample nor the 1° C./min sample become LT-LiMnO$_2$ after heating to 350° C., because insufficient water remains in the samples to facilitate the ion exchange between Li and H before the γ-MnOOH decomposes near 220° C. Note that the expected mass loss in the reaction LiOH·H$_2$O+γ-MnOOH→LiMnO$_2$ is 27.7%, consistent with the sample heated at 10° C./min. To lower reaction temperatures as much as possible and to minimize such decomposition, water must be present as the ion-exchange solvent, so that LiOH is effectively in the solution phase.

This example shows that the presence of water is a key to the invention process and also to a prior art process. LiMnO$_2$ clearly forms from a pressed pellet reaction below 200° C., if water vapour (in this case from the water of hydration of LiOH·H$_2$O) is present until about 100° C. LT-LiMnO$_2$ does not form if there is no water present.

Example 2

Figure 14:
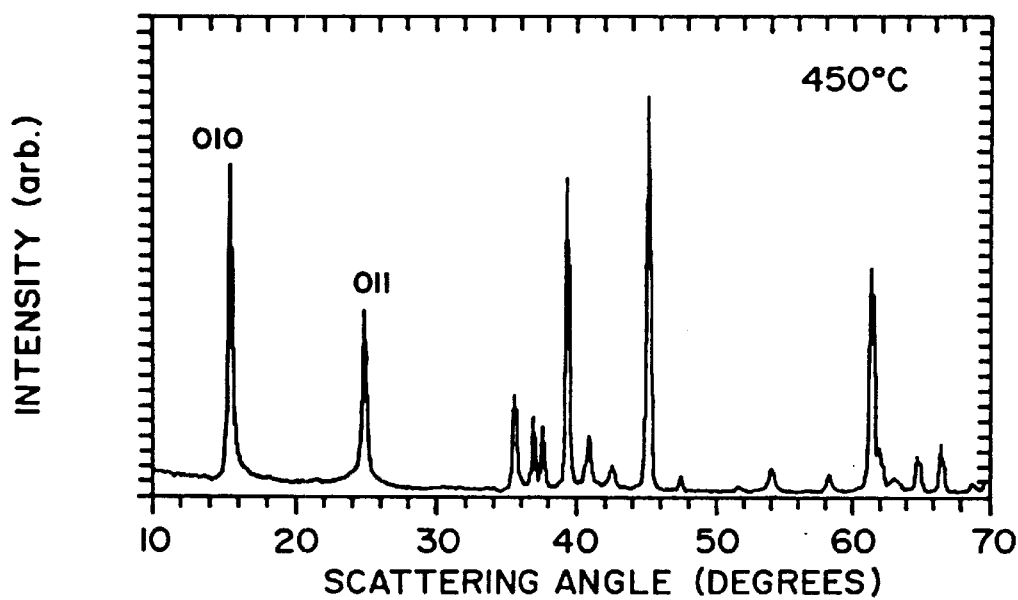
FIG. 14 shows the powder X-ray diffraction pattern of $LT-Li_xMnO_2$ prepared in illustrative example 2.

A wrapped pellet as in comparative example 1 was prepared and heated to 450° C. under argon flow for 18 hours. The diffraction pattern of the powdered product is shown in FIG. 14. This agrees well with the literature pattern described in comparative example one. Notice that the width of the 011 peak near 24.7 degrees has decreased compared to the data shown in FIG. 3. This is due to increased crystallinity on higher temperature heating.

Figure 15:
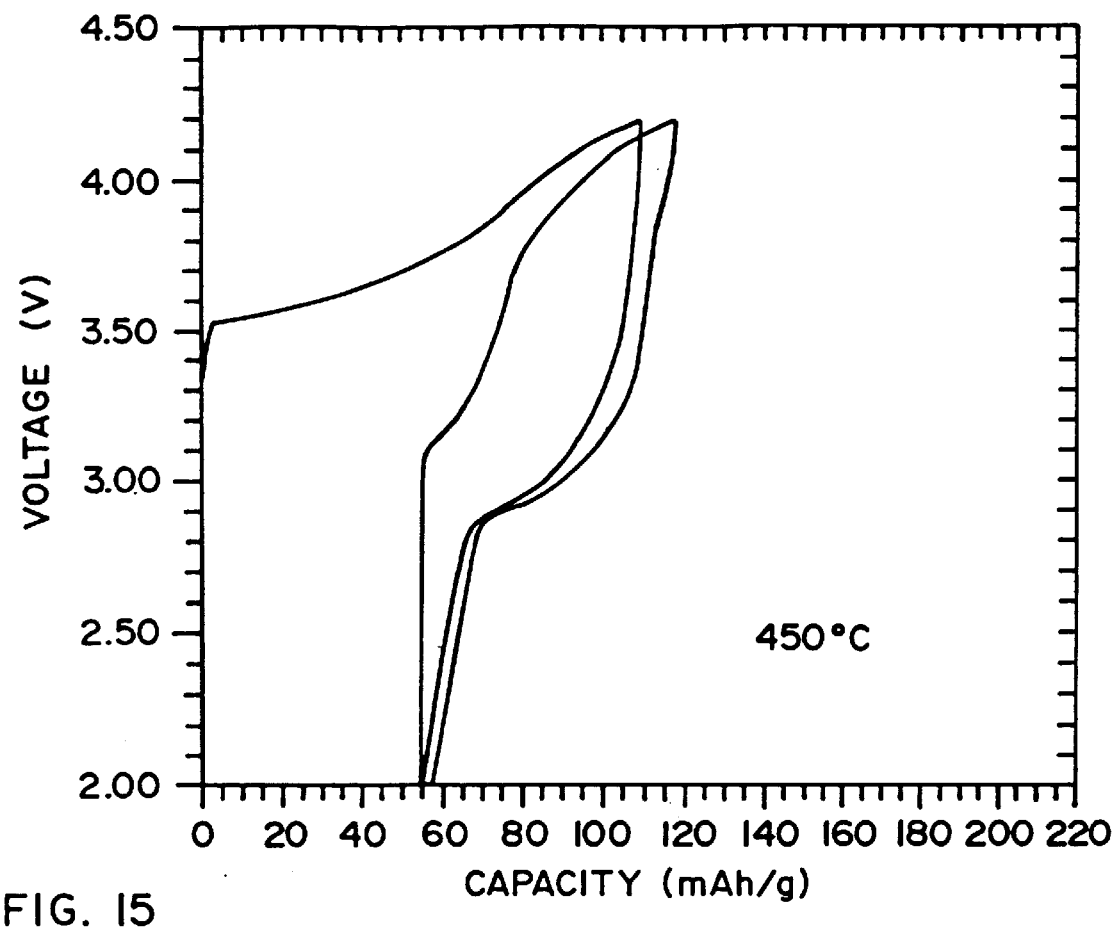
FIG. 15 shows the voltage versus capacity curves for a laboratory test cell using a lithium anode and a cathode of the material prepared in illustrative example 2.

A test cell was assembled using this powder. FIG. 15 shows the voltage-capacity relation for this cell. This cell obtains only about 60 mAh/g of reversible capacity between 2.0 and 4.2 V.

This example illustrates that the electrochemical properties of this lithium manganese oxide can be drastically reduced by overheating the LT-LiMnO$_2$ of Comparative Example 1 to 450° C. (The correlation of broader x-ray diffraction peaks with reduced heat treatment temperature to greater electrochemical capacity is similar in general to that mentioned in U.S. Pat. No. 4,828,834 with reference to LiMn$_2$O$_4$ solid solution compounds.)

Example 3

3.543 g LiOH·H$_2$O and 6.457 g γ-MnOOH were ground together to prepare an intimate mixture. From this mixture, 4.595 g was extracted and pressed at 1000 bar into a 1" diameter pellet. The pellet was wrapped in Al foil and heated to 200° C. for 1 hour in air. The final mass of the pellet was 3.334 g after heating. For a 27.7% weight loss (expected if the product is LT-LiMnO$_2$) the final mass is calculated to be 3.322 g, in good agreement with experiment. The x-ray diffraction pattern of this powder resembled that shown in FIGS. 3, 6 and 8, showing that LT-LiMnO$_2$ was indeed produced.

This example shows that once formed, LT-LiMnO$_2$ is stable in air to just under 200° C.

Figure 16:
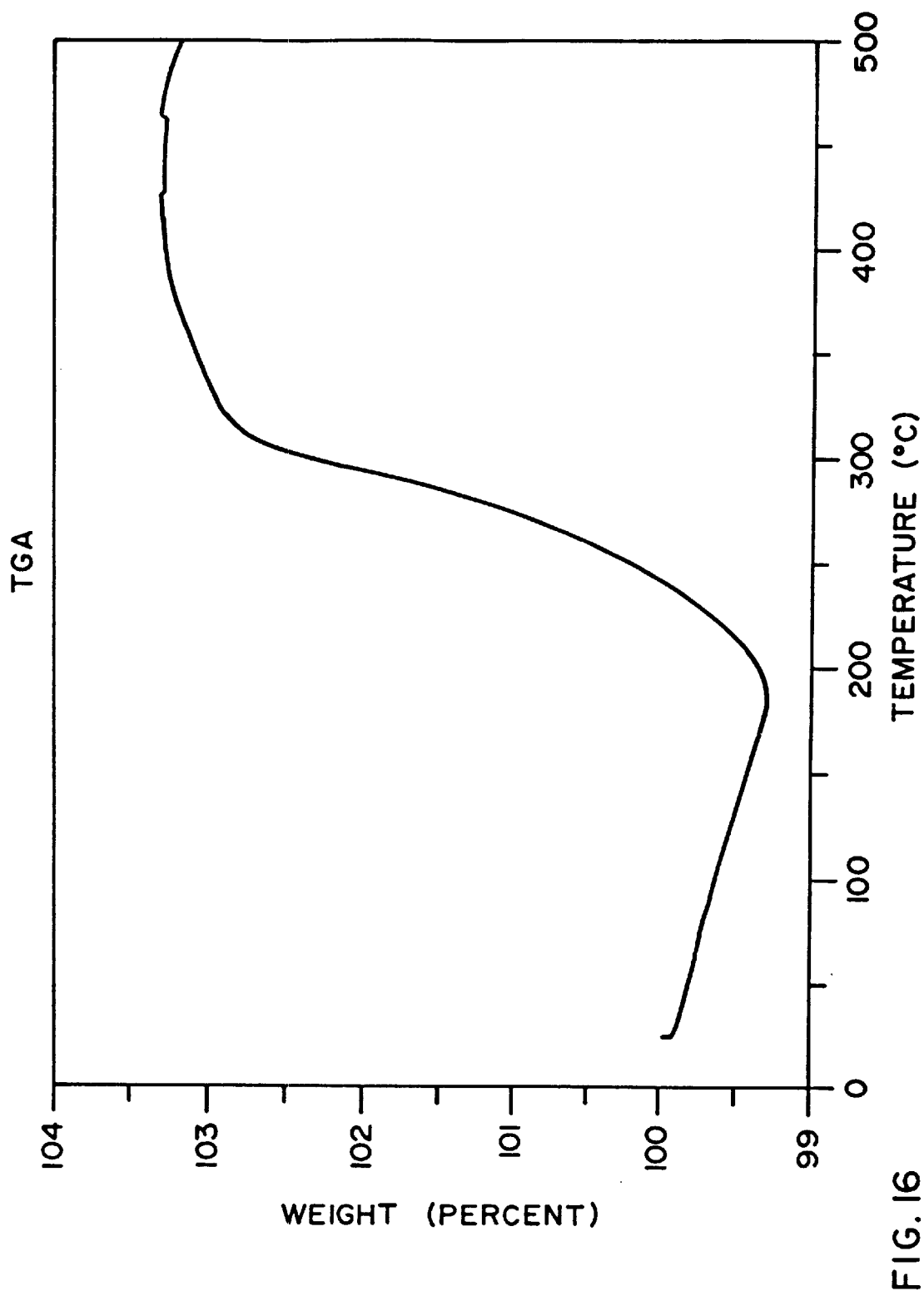
FIG. 16 shows the thermogravimetric data for the material prepared as in illustrative example 3.

A TGA analysis of a powdered sample of the material of invention example 2 was performed in an air atmosphere (instead of argon as in Inventive Example 3). The x-ray diffraction profile of the heated product resembles that of LiMn$_2$O$_4$ and Li$_2$MnO$_3$. Thus it appears that the material is oxidized above 200°. Note also that the material of Inventive Example 2 was actually estimated to be Li$_{0.88}$MnO$_2$, not LiMnO$_2$. As shown in FIG. 16, weight gain begins near 200° C. as the assumed reaction

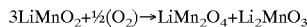

occurs. The weight gain expected in this reaction is 5.6%, but the experiment only shows about 3%, suggesting that it has not gone fully to completion, or that another reaction has taken place.

This example shows that LT-LiMnO$_2$ does not appear to be stable in air above 200° C. Above this temperature, a vacuum or inert gas such as Argon, must be used for processing (as in Inventive Example 3). This demonstrates the importance of the type of process gas used and that simplification is possible if low temperature processing can be used.

Example 4

Figure 17:
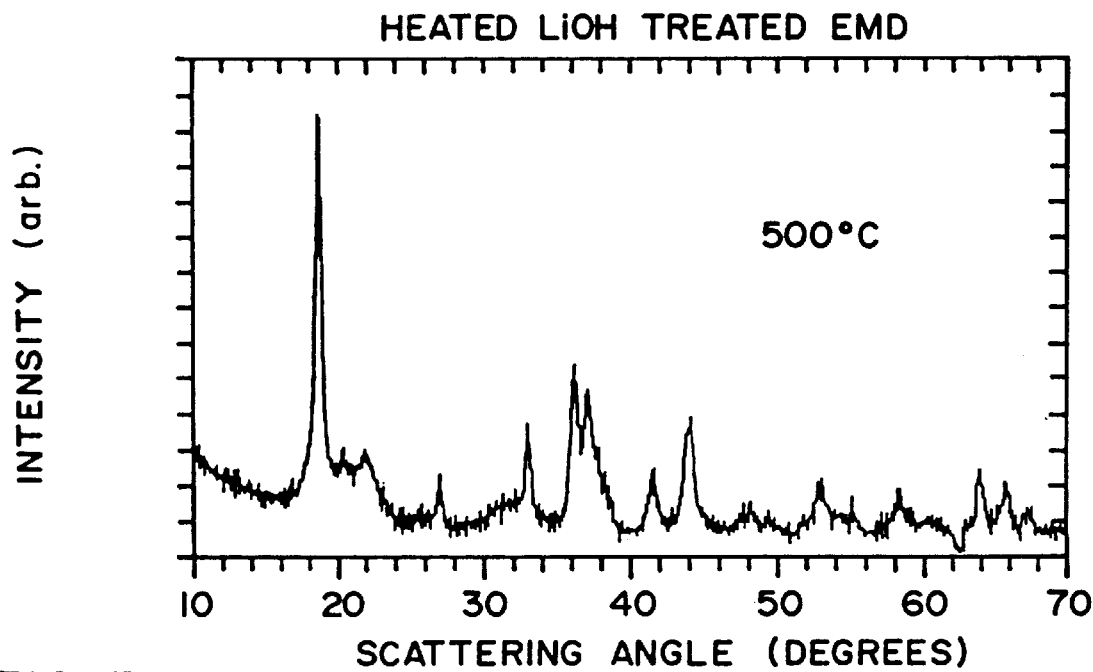
FIG. 17 shows the powder X-ray diffraction pattern of the mixture of phases prepared in illustrative example 4.

3.0 gms of electrolytic MnO$_2$ or EMD (from Mitsui, TAD 1 grade) was refluxed under boiling conditions in 50 mls of 4M LiOH solution for six hours. Some of the suspension was poured into a centrifuge tube and settled by centrifugation. The liquid was then decanted, leaving minimal residual salt solution behind. The resultant wet powder was then heat treated in air at 500° C. for greater than two hours. According to the Acta Chemica Sinica reference mentioned previously, these are the optimum conditions for preparing the ion exchange material identified as LiMn$_2$O$_4$. FIG. 17 shows the x-ray diffraction pattern of the example material. It is clearly a mixture of phases which may include some contribution from LiMn$_2$O$_4$, but is far from substantially pure.

While EMD has some bound water, it does not have a substantial amount. Consequently, EMD is often represented as MnO$_2$ only, without mention of hydrogen. Since virtually all the residual LiOH in solution was decanted away and since there is insufficient hydrogen to exchange with a substantial amount of lithium in EMD, the material LiMn$_2$O$_4$ was not the result of the example process. The Acta Chemica Sinica reference does not disclose sufficient detail but their result can easily be explained if significant residual LiOH remained prior to heat treatment (ie: an intermediary step wherein the partially exchanged lithium MnO$_2$ compound is in intimate contact with LiOH. A solid state reaction therebetween could then result in further lithiation of the manganese oxide).

This example demonstrates that the invention process differs from the prior art and that LiMn$_2$O$_4$, a compound with substantial Li content, cannot be prepared by ion exchange if the starting material does not have a substantial amount of ions with which to exchange.

While the disclosure only shows some specific materials have been prepared using this novel process, it is intended that other materials prepared in a similar manner be within the scope of this invention. A table of starting materials that could be used to prepare useful and perhaps novel materials using a similar low temperature ion exchange process is shown in the following Table.

Members of said Table include a variety of transition metal oxide hydroxides that can be represented as either MOOH or M(OH)$_{21}$, or alternatively, as either HMO$_2$ and H$_2$MO$_2$ respectively, wherein M can be Mn, Fe, Ni, Co, V, Cr or Sc. The data for said Table has been compiled using information provided in the JCPDS-X-ray Powder Diffraction Database (1990). Some members have been synthesized artificially and have no given name. In like manner to the aforementioned examples, it is expected that H atoms in members of said Table might be exchanged for other common ion exchangeable elements via the method of the invention (eg. Group Ia elements or alkaline earth metals).

TABLE 3

Transition Metal Oxide Hydroxides MOOH and M(OH)$_2$ Materials

| Structure\M | Sc | V | Cr | Mn | Fe | Co | Ni |
|---|---|---|---|---|---|---|---|
| Ramsdelite Orth. Pbnm | α-ScOOH | Montroseite | Bracewellite | Groutite α-MnOOH | Goethite α-FeOOH | No Name | |
| LiNiO$_2$ Str. Hex. R-3m 3R Stacking | | | Grimaldiite-3R | | | Heterogenite-3R | |
| Hex. Pb$_3$/mmc 2H stacking | | | | | Feroxyhyte* | Heterogenite-2H | |
| Hex. P3$_1$2 1H Stacking | | | | Pyrochroite Mn(OH)$_2$ | δ-FeOOH & Fe(OH)$_2$ | β-Co(OH)$_2$ | β-NiOOH2** & Theopharastite Ni(OH)$_2$ |
| InOOH Str. Orth. P2$_1$mn | No Name | No Name | | | No Name | | No Name (High Pres.) |
| Manganite Mono. P2$_1$/a | | | | γ-MnOOH† | | | |
| Lepidocrocite Orth. Amam | γ-ScOOH | | | | γ-FeOOH Lepidocrocite | | |
| Layered | | | | Feitnechtite β-MnOOH | | | |
| Orth. Pnnm | | | Guyanaite | | | | |
| Cryptomelane Struct. Tet. 14/m | | | | | Akaganeite | | |
| Hex. 4 or 5H stacking? | | | | | | | γ-NiOOH |

*Distorted from ideal 2H-Heterogenite structure
**Based on only three diffraction lines As will be apparent to those skilled in the art in the light of the foregoing disclosure, many alterations and modifications are possible in the practice of this invention without departing from the spirit or scope thereof. For instance, the solid solution starting compounds specifically disclosed herein all have stoichiometries wherein y=1 or 2. However the solid solution solution starting compound could already be partially exchanged (e.g., $H_{1.7}Li_{0.3}MnO_2$) at the outset. Accordingly, the scope of the invention is to be construed in accordance with the substance defined by the following claims.

What is claimed is:

1. A method of preparing a solid solution compound having the formula $Li_xMnO2$ wherein x is a number in the range from about 0.5 to about 2, which comprises the steps of:

(a) selecting a manganese oxide hydroxide solid solution starting compound having the formula $H_yMnO_2$ wherein y is a number in the range from about 1 to about 2;

(b) selecting an amount of a lithium salt providing in excess of x moles of lithium;

(c) preparing a mixture of said solid solution starting compound, said amount of lithium salt, and water;

(d) treating the mixture at a temperature below the decomposition temperature of said solid solution starting compound such that the presence of water is maintained throughout the treating and such that hydrogen ions in said solid starting solution compound are exchanged for lithium to produce an intermediate ion exchanged solid solution compound essentially having the formula $H_{y-x}Li_xMnO_2$ and the structure of said solid solution starting compound;

(e) separating said intermediate ion exchanged solid solution compound from the water and the residual lithium salt in the mixture; and (f) drying said intermediate ion exchanged solid solution compound so that any remaining hydrogen is removed thereby producing the $Li_xMnO_2$ solid solution compound.

2. A method as claimed in claim 1 wherein the mixture comprises a liquid aqueous solution of the lithium salt.

3. A method as claimed in claim 1 wherein the manganese oxide hydroxide solid starting solution compound is selected from the group consisting of α-MnOOH, β-MnOOH, γ-MnOOH, and Mn(OH)$_2$.

4. A method as claimed in claim 2 wherein the manganese oxide hydroxide solid starting solution compound is selected from the group consisting of α-MnOOH, β-MnOOH, γ-MnOOH, and Mn(OH)$_2$.

5. A method as claimed in claim 1 wherein the manganese oxide hydroxide solid starting solution compound comprises γ-MnOOH.

6. A method as claimed in claim 2 wherein the manganese oxide hydroxide solid starting solution compound comprises γ-MnOOH.

7. A method as claimed in claim 1 wherein the lithium salt is lithium hydroxide.

8. A method as claimed in claim 2 wherein the treating temperature is about the boiling point of the aqueous solution.

9. A method as claimed in claim 1 wherein the separating step comprises centrifuging, filtering, or rinsing said intermediate ion exchanged solid solution.

10. A method as claimed in claim 1 wherein the drying step takes place at a drying temperature below about 350° C.

11. A method as claimed in claim 1 for preparing LT-LiMnO$_2$ wherein the manganese oxide hydroxide solid starting solution compound comprises γ-MnOOH and x is about 1.

12. A method as claimed in claim 1 for preparing spinel LiMn$_2$O$_4$ wherein the manganese oxide hydroxide solid starting solution compound comprises γ-MnOOH and x is about 0.5 which additionally comprises the step of heating the intermediate ion exchanged solid solution compound above about 350° C. thereby rearranging the structure of the intermediate ion exchanged solid solution compound to a spinel structure.

* * * * *

UNITED STATES PATENT AND TRADEMARK OFFICE
CERTIFICATE OF CORRECTION

PATENT NO. : 5,961,950
DATED : October 5, 1999
INVENTOR(S) : Jeffery Raymond Dahn; Erik Rossen; Jan N. Reimers; Eric Wayne Fuller It is certified that error appears in the above-identified patent and that said Letters Patent are hereby corrected as shown below:

Column 4, line 27, delete "soltion" and insert --solution--. Column 15, line 36, delete "solution solution" and insert --solution--.

Signed and Sealed this

Tenth Day of April, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 5,961,950
DATED : October 5, 1999
INVENTOR(S) : Jeffery Raymond Dahn, Erik Rossen, Jan N. Reimers and Eric Wayne Fuller It is certified that error appears in the above-identified patent and that said Letters Patent is hereby corrected as shown below:

Column 14,
Line 51, delete "$M(OH)_{21}$" and insert -- $M(OH)_2$ --.

Column 15,
Line 42, delete "$Li_xMnO2$" and insert -- $Li_xMnO_2$ --.

Columns 15 and 16,
Delete Table 3 and insert therefor

TABLE 3

| Structure/M | \multicolumn{7}{c}{Transition Metal Oxide Hydroxides MOOH and $M(OH)_2$ Materials} |
|---|---|---|---|---|---|---|---|
| | Sc | V | Cr | Mn | Fe | Co | Ni |
| Ramsdelite Orth. Pbnm | α-ScOOH | Montroseite | Bracewellite | Groutite α-MnOOH | Goethite α-FeOOH | No Name | |
| $LiNiO_2$ Str. Hex. R-3m 3R Stacking | | | Grimaldiite-3R | | | Heterogenite-3R | |
| Hex. Pb./mmc 2H stacking | | | | | Feroxyhtye* | Heterogenite-2H | |
| Hex. P3,2 1H stacking | | | | Pyrochroite $Mn(OH)_2$ | δ-FeOOH & $Fe(OH)_2$ | β-Co(OH)$_2$ | β-NiOOH2** & Theopharastite $Ni(OH)_2$ |
| InOOH Str. Orth. P2,mn | No Name | No Name | | | No Name | | No Name (High Pres.) |
| Manganite Mono. P2,/a | | | | γ-MnOOH† | | | |
| Lepidocrocite Orth. Amam | γ-ScOOH | | | | γ-FeOOH Lepidocrocite | | |
| Layered | | | | Feitnechtite β-MnOOH | | | |
| Orth. Pnnm | | | Guyanaite | | | | |
| Cryptomelane Struct. Tet. 14/m | | | | | Akaganeite | | |
| Hex. 4 or 5H stacking? | | | | | | | γ-NiOOH |

*Distorted from ideal 2H-Heterogenite structure
**Based on only three diffraction lines Signed and Sealed this Second Day of July, 2002

Attest:

Attesting Officer

JAMES E. ROGAN
Director of the United States Patent and Trademark Office